UNITED STATES PATENT OFFICE.

JOHN JAMES HOOD, OF LONDON, ENGLAND, ASSIGNOR TO THE OIL REFINING IMPROVEMENTS COMPANY, LIMITED, OF GLASGOW, NORTH BRITAIN.

PURIFICATION OF PETROLEUM OILS.

1,404,293.    Specification of Letters Patent.    Patented Jan. 24, 1922.

No Drawing.    Application filed July 22, 1919.  Serial No. 312,613.

*To all whom it may concern:*

Be it known that I, JOHN JAMES HOOD, a subject of the King of Great Britain, residing at 4 Canonbury Park North, London, England, have invented new and useful Improvements in the Purification of Petroleum Oils, of which the following is a specification:

This invention has for its object the desulphurization of mineral or petroleum oils whether occurring naturally or obtained in the process of destructive distillation of shale and similar minerals. As is well known, all these liquids are more or less contaminated by organic sulphur bodies, the nature of which is not exactly known. They may belong to what are classed as the thiophenes or the mercaptans, or occur as sulphides of organic radicals, and their presence in combustible oils, such as gasolines and kerosenes, is objectionable, not only because of their offensive odor, but also because during the process of combustion the sulphur is more or less converted into sulphuric acid or sulphur dioxide.

Each particular variety of these oils appears to have its own characteristic sulphur bodies present in the products obtained by distillation. For instance, the oils of Burmah contain very little or only traces of these bodies, whereas the oils of Persia and Mexico are comparatively rich in sulphur compounds, and in one variety of oil they may accumulate more in the lighter fractions than in the heavier ones, while with another variety of oil the heavier fractions may contain more sulphur than do the lighter ones. The stability of these ingredients is also very variable. Some suffer decomposition during the very act of distillation in separating the different fractions of gasolines, kerosenes, and lubricating oils. Others of a more stable character pass into these prepared materials, deteriorating their quality, as the temperatures at which the different distillations have been effected have been insufficient to break up or disassociate them. That is, the heat of distillation alone will not decompose such sulphur compounds in oils of this latter class.

According to this invention, an oil is heated sufficiently to vaporize it, and this vapor is passed into contact with certain granular bodies, by which means the sulphur compounds contained therein are disassociated or in some cases absorbed. When disassociation takes place the sulphur is usually liberated as sulphuretted hydrogen which may be absorbed by oxide of iron, Weldon mud or other material in the customary manner. If the oil has been obtained by fractional distillation, the temperatures to which it is heated should generally be greater than that at which it was distilled.

The granulated solid body which I employ is by preference ignited and granulated native magnesite. This material is contained in a suitable apparatus which may be in the form of cylindrical retorts, and is maintained at a suitable temperature. As pointed out above, this temperature depends on the particular oil being treated and also on the stability of the sulphur bodies which are to be broken up or disassociated.

In some cases petroleum oils of high boiling point, such as solar oil or fuel oil, on being passed into contact with the ignited magnesite maintained at a high temperature, will not only have the sulphur bodies contained in them disassociated with the liberation of sulphuretted hydrogen, but the oils themselves will be decomposed so that lighter oils may be obtained.

The following example of procedure within the scope of the invention is given.

A Persian oil distillate having about the boiling point range of ordinary kerosene, and containing a moderate percentage of sulfur, was vaporized and the vapors passed over ignited magnesite, the latter being at a temperature of just above the top of the boiling point range of the kerosene treated.

I claim:

1. The process of desulphurizing hydrocarbon oil which comprises vaporizing the oil, bringing the vapor into contact with ignited magnesite to disassociate the sulphur compounds, and passing the resultant vapors over an absorbent of the sulphur compounds.

2. The process of desulphurizing hydrocarbon oils which comprises vaporizing the oil, bringing the vapor into contact with ignited magnesite to liberate sulphuretted hydrogen, and removing said sulphuretted hydrogen.

3. The process of desulphurizing hydrocarbon oils which comprises vaporizing the oil, bringing the vapor into contact with ignited magnesite at a temperature higher than the distillation temperature of the oil to convert the sulphur compounds largely into gaseous form, and then absorbing said gaseous sulphur compounds.

4. The process of desulphurizing hydrocarbon oils which comprises vaporizing the oil, bringing the vapor into contact with ignited magnesite to convert the sulphur compounds largely into sulphureted hydrogen, and passing the vapors over oxide of iron.

In testimony that I claim the foregoing as my invention I have signed my name this 25th day of June, 1919.

JOHN JAMES HOOD.